United States Patent [19]

Mezrich et al.

[11] 4,297,009

[45] Oct. 27, 1981

[54] IMAGE STORAGE AND DISPLAY

[75] Inventors: Reuben S. Mezrich, Miami, Fla.; Alec Colleoni, New Brunswick; David J. Lyons, Trenton, both of N.J.

[73] Assignee: Technicare Corporation, Solon, Ohio

[21] Appl. No.: 111,512

[22] Filed: Jan. 11, 1980

[51] Int. Cl.³ .............................................. G03B 21/32
[52] U.S. Cl. ..................................... 352/86; 352/102
[58] Field of Search ................. 352/43, 84, 86, 102, 352/103, 2

[56] References Cited

U.S. PATENT DOCUMENTS

| | | |
|---|---|---|
| 661,515 | 11/1900 | Giel . |
| 1,236,819 | 8/1917 | Bulask et al. . |
| 2,189,374 | 2/1940 | Surbeck . |
| 2,203,437 | 6/1940 | Levy .................................... 352/103 |
| 3,140,415 | 7/1964 | Ketchpel . |
| 3,202,985 | 8/1965 | Perkins et al. . |
| 3,204,238 | 8/1965 | Skellett . |
| 3,300,779 | 1/1967 | Sirkis . |
| 3,428,393 | 2/1969 | Montebello ......................... 352/86 |
| 3,462,213 | 8/1969 | Montebello ......................... 352/86 |

Primary Examiner—Monroe H. Hayes
Attorney, Agent, or Firm—Audley A. Ciamporcero, Jr.

[57] ABSTRACT

Images and respectively associated timing marks are arrayed, as phototransparencies, about a disk. The disk is rotated and the timing marks are sensed. Display occurs either in two-dimensional fashion, such as in a television system, or in three-dimensional fashion such as in a semitransparent full image projection. Associated logic circuitry determines whether the full 3-D transparency is to be produced, in which case all images on the disk are to be illuminated, or whether swim through will occur, either on an image at a time or on a "ham slice" projection basis.

9 Claims, 6 Drawing Figures

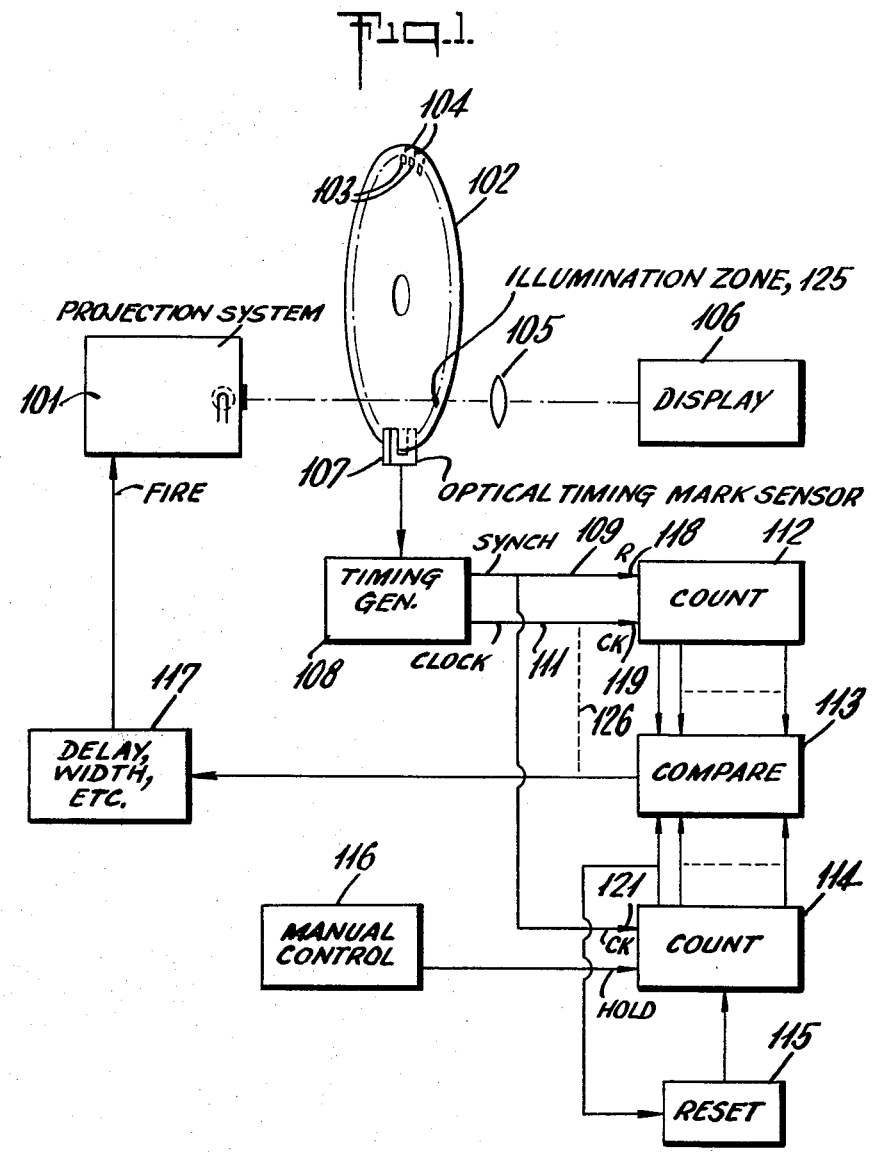

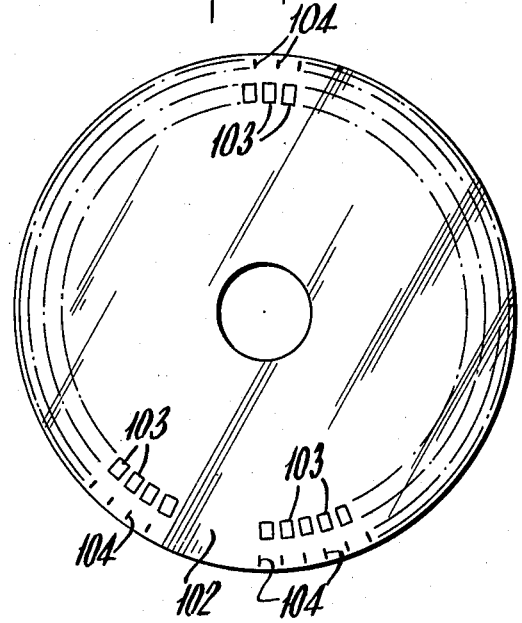
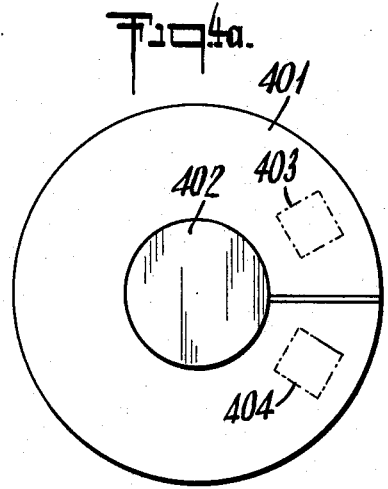 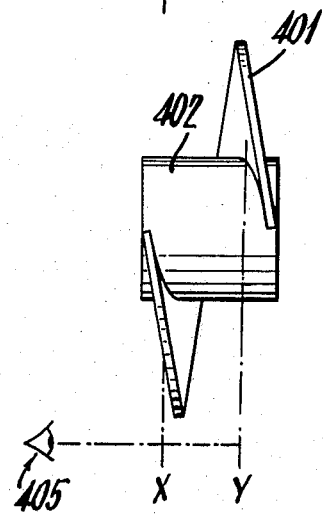

IMAGE STORAGE AND DISPLAY

FIELD OF THE INVENTION

This invention relates to image storage and display systems, and more particularly systems for economical and efficient storage and display of sequentially associated images, such as positionally related images of organs of the human body.

BACKGROUND OF THE INVENTION AND PRIOR ART

Researchers in diagnostic imaging increasingly are voicing concern that as the technological capabilities of imaging methods and modalities are improved, the sheer volume of data produced is becoming overwhelming. For example, ultrasonic imaging is being applied with great success to breast screening, achieving resolutions in the range of 1 millimeter. For such systems, as many as 100 cross-sectional images are needed fully to scan a single breast. When it is contemplated that screening centers will process hundreds of patients per day, it is evident that the technological capabilities efficiently to display and discern detail will far outstrip the physician's ability to utilize and appreciate such detail. Clearly, means must be found to help the physician process this flood of detail.

It has been suggested that computer techniques be employed. Such an approach may prove fruitful when the clinical signs of malignancy become better understood, and when the power of computer pattern recognition techniques increases well beyond its present primitive state; for the present, however, known technology cannot be used profitably for the sort of applications and problems involved in large population screening programs. Clinical signs of occult tumors are subtle, sometimes even evading the careful scrutiny of trained observers. In fact, the relative importance of various signs are now the subject of considerable debate. Accordingly, computer/algorithmic techniques for automatic investigation of screening—diagnostic images are not presently a viable alternative, and for the foreseeable future will continue not to be.

Remarkably, trained clinicians have pattern recognition facilities which subliminally integrate primary, secondary, and tertiary effects and patterns in order to draw diagnostic and pathologic conclusions, provided that the data are conveniently and efficiently presented in space and time. It is, accordingly, a primary object of the present invention to provide image storage and display techniques which permit the clinician to exercise learned and inherent pattern recognition techniques efficiently to detect lesions, malignancies, and abnormalities in tissue structures. An associated object, of course, is to enable such investigations and conclusions to be conducted rapidly and on a high volume basis, whereby high population screening programs become practically, as well as technologically effective.

Once it is determined to utilize direct, human review of the large number of frames entailed in scanning an organ, logical imperatives dictate either viewing them all at once (e.g. in the form of a semi-transparent three-dimensional projection), viewing individual images rapidly sequentially, or viewing smaller numbers at a time, with the aggregate being viewed rapidly sequentially. Having stated the goal or object, however, to be an efficient, accurate presentation, with the observer having full facility for detection of very small and perhaps not particularly clearly defined tissue abnormalities, implementation is quite a difficult proposition.

One relevant class of prior art systems relates to production and display of a three-dimensional projection. Exemplary of this class of system are the schemes set forth in U.S. Pat. Nos. 3,202,985 to Perkins et al., 3,462,213 to deMontebello, and 2,189,374 to Surbeck. Each of those patents, in their own fashion, utilizes some sort of physical oscillation or variable displacement of the point of image projection, on a rapid repeating basis, whereby an aggregate of multiple projections over a predetermined depth range give the viewer an impression of three-dimensionality. The Perkins et al. patent describes utilization of a spherical spiral screen, deMontebello teaches utilization of spiral wheels with projection being directed radially outward from the axis, and Surbeck teaches utilization of a helical, screw-type planar projection screen. All three types, however, rely on spatial variation of the projection surface, which is apprehended by the viewer as a volumetrically continuous, semi-transparent three-dimensional display.

A similar, related class of display utilizes formed, rotating phosphorescent screens within a cathode ray tube, achieving the same effect but in a sealed, electronic format. Exemplary of this class are U.S. Pat. Nos. 3,204,238 to Skellett and 3,140,415 to Ketchpel.

It is an object of the present invention to provide display methods and systems which, if desired, may utilize the foregoing prior art approaches based on variable depth screens and concomitant three-dimension illusions, but which substantially obviate prior art problems of flicker, instability, and mechanical bulk.

A technologically ancient approach to multiple frame viewing relates to utilization of a disk photo record, along the periphery of which is disposed a plurality of sequentially associated images. These systems, such as exemplified in U.S. Pat. Nos. 661,515 to Giel, 1,236,819 to Bulask et al., and others, generally were developed as precursors to modern film-type viewing, with the illusion of motion being obtained by rapid, stroboscopic illumination of sequentially associated images. While these systems were hardly suitable for larger scale motion picture applications, they do teach useful techniques for storage of a rather smaller number of sequentially associated images.

It is an object of the present invention to utilize disk-type photo information records to display usefully and efficiently the number and type of images which might be utilized in clinical or screening applications of diagnostic imaging systems.

While the previously described classes of prior art information storage and display systems are technologically interesting and conceptually generally sound, they are generally premised on elaborate electromechanical workings, and provide numerous structural, mechanical, and the like inconveniences, and further impose considerable dependency of the viewer upon the rigid timing limitations which are fundamental to the system. For example, the nature of the aforementioned 3-D display systems makes it quite difficult, if not impossible, for the viewer to focus attention upon very small, microportions of the tissue image in interest, to "zoom" electronically or optically to areas of greater interest, or to manipulate data for more abbreviated or effective presentation.

It is an object of the present invention to provide systems which afford the viewer the capacity to view tissue images, in the aggregate, either three-dimensionally or in smaller portions, including an image at a time rapidly viewed in sequence, or in partial or total sections viewed three-dimensionally and simultaneously, with respective successive sets being so reviewed rapidly sequentially.

SUMMARY OF THE INVENTION

The principles of the present invention are premised upon utilization of a single disk-style storage film wherein all cross-sectional images of a given organ are stored in sequentially related fashion, preferably in an annular configuration about a center of rotation of the disk. At the option of the viewer, these images may be viewed sequentially in a rapid manner such that the observer "swims through" the object. Alternatively, by utilization of a spatially or physically varying depth screen, and suitable timing of image illumination, all images may be seen simultaneously so that the observer perceives a three-dimensional transparency of the entire object. In either case, the viewer is free to isolate any particular image or subset of images, or any portion thereof, and provide greater attention or alertness with respect to those portions of greater interest.

In a preferred embodiment, the principles of the present invention utilize a rotatable, disk-type photo transparency record having a plurality of sequentially associated images being sequentially disposed in an annulus around the center of rotation of the disk, each image having a respectively associated timing mark. A projection system is provided for intermittently illuminating a zone of said disk, so that as the disk is rotated, and the images pass through the zone, particular images of interest may be illuminated by a suitable source, and the images so illuminated are displayed, either directly or through television style systems. Means are provided, preferably optical sensors, for sensing disk rotation by detecting the motion of timing marks past a given point, so that, based on such sensing, appropriate timing signals are generated for individual image illumination and for repetitious viewing thereof.

In accordance with the principles of the present invention, control of those images to be illuminated and those images to be bypassed is established by stored counts in separate counters, which are respectively incremented by select signals generated in accordance with the optical monitoring of timing marks on the disk. In particular, one counter is incremented upon each detection of a timing mark, and reset upon each full circuit of the disk, whereas the other counter is incremented upon each full circuit, and preferably automatically counts itself up and down in recirculating fashion. A comparator monitors count stored in the respective counters, and when they are equal, a next specific image, or group of images, passing through an illumination zone is illuminated. In the event that one image is illuminated for each such comparison noting equality, there will be presented for display a "swim through", an image at a time at a high rate, back and forth through the imaged tissue or organ as the second counter recirculates. Three-dimensional or "ham slice" display is also possible, if the second counter means is incremented by yet another counter, which itself is selectively incremented and recirculated by the optical pulse detection apparatus, provided that appropriate 3-D screening mechanisms are utilized.

DESCRIPTION OF THE DRAWINGS

FIG. 1 shows a schematic representation of an illustrative embodiment of the principles of the present invention;

FIG. 2 shows an illustrative disk storage system useful in conjunction with the principles of the present invention;

FIGS. 4A and 4B show respective isometric views of a projection screen useful in accordance with the principles of the present invention to provide three-dimensional images.

BEST MODE FOR CARRYING OUT THE INVENTION

Figure 3A:
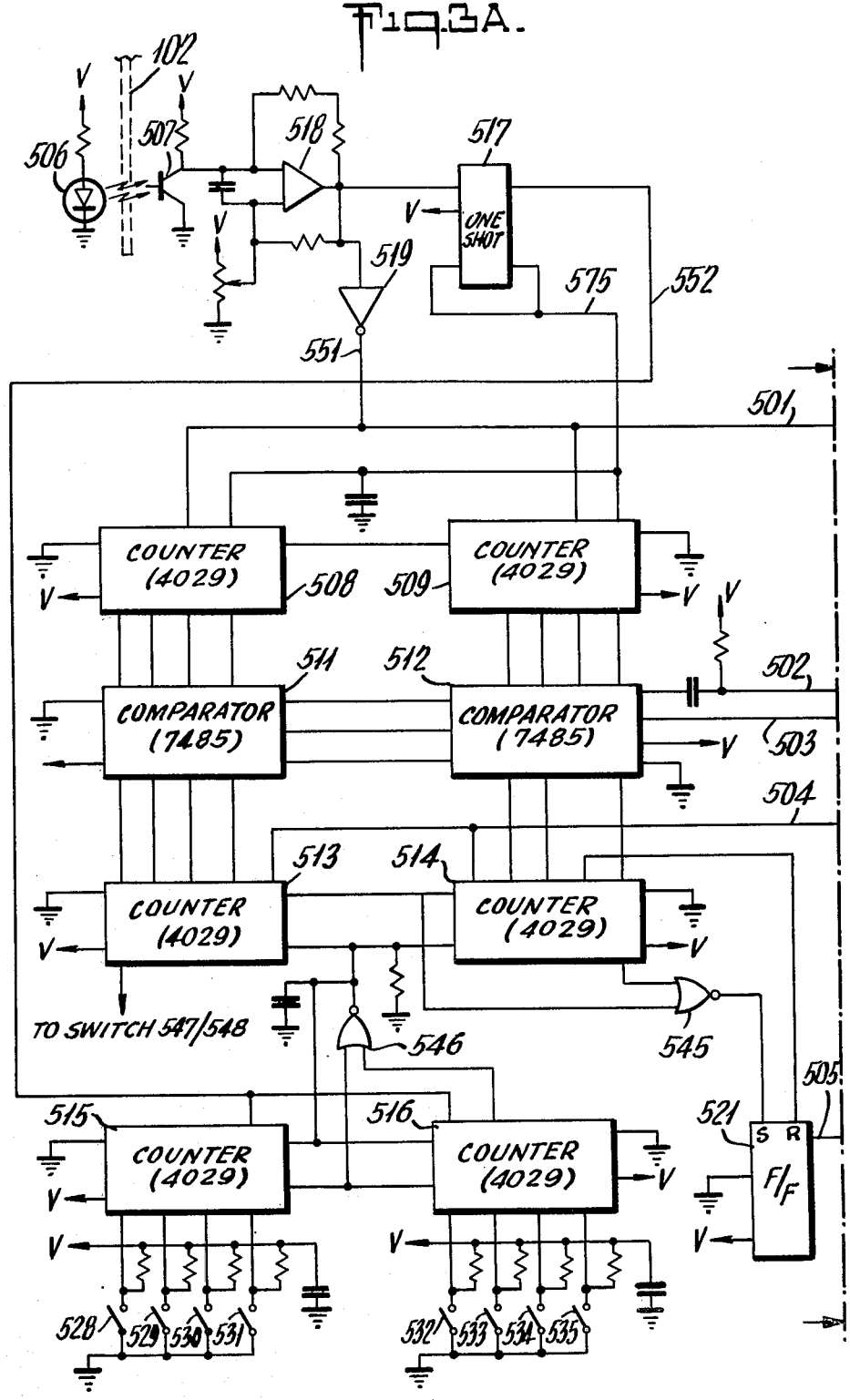
FIGS. 3A and 3B show a detailed circuit schematic of projection monitoring and control apparatus in accordance with a preferred embodiment of the principles of the present invention.

Referring jointly to FIGS. 1 and 2, there is shown an illustrative embodiment of the principles of the present invention. Specifically, FIG. 1 shows in generally schematic form a "swim through" system embodying the principles of the present invention, and FIG. 2 shows a preferred form of disk-type photorecord useful in conjunction with the system of FIG. 1. As shown in FIG. 1, a projection system 101 illuminates a particular zone of the disk 102, designated the illumination zone 125, whenever a firing signal is provided to the projection system from signal conditioning circuitry 117. The projection system 101 is "controllably stroboscopic" in the sense that it may be energized to be turned on and off quite selectively, both in terms of timing and duration, thereby to illuminate specific images 103 on the disk 102 as they pass through the illumination zone. Preferably, the images 103 are phototransparencies, such that a given image 103 which is illuminated in the illumination zone 125 causes a projection of the image to be focused by lens system 105 to a display 106, there to be apprehended by the viewer. As noted hereinafter, the display 106 preferably includes television type display systems, but for 3-D projections, alternatively may include other types of display.

As may be seen more clearly in FIG. 2, each of the images 103 is associated with a timing mark 104, which marks are, in one to one correspondence with the images, disposed in an annulus at a predetermined radius out from the center of rotation of the disk. As shown in FIG. 1, an optical timing mark sensor 107 is adapted to sense the passage of the timing marks 104, as the disk 102 is rotated about its center of rotation. It will be appreciated that careful monitoring of the passage of timing marks 104 through the sensor 107, and noting the aggregate number of such passages, will allow for a controlled, timed firing of the projection system to illuminate particular ones or series of the images 103 as they pass through the illumination zone. Typically, the optical timing mark sensor comprises a light emitting diode on one side of the disk 102, and a photoreceptor on the other side, whereby passage of each timing mark 104 through the sensor creates discontinuities in an electrical signal representative of the light from the photodiode/transmitter to the phototransistor/receiver of the sensor 107. Such a signal is forwarded to the timing generator 108. It is the function of the timing generator 108 to develop two classes of signal. A clock signal on line 111 has one pulse for each timing mark 104 detected by the sensor 107 as the disk 102 rotates.

Additionally, the timing generator 108 provides a synch pulse signal on line 109 which has one pulse for each complete rotation of the disk 102. As shown in FIG. 1, the clock signal and synch signal are applied to counters 112 and 114.

As shown in FIG. 1, the first counter 112 is an up-counter having its clock input fed by the clock signal from the timing generator 108; hence, the counter 112 maintains in storage a count equal to the number of timing marks which have passed the sensor 107 since the last previous resetting of the counter 112. The reset input 118 of counter 112 is fed by the synch pulse signal from timing generator 108. Accordingly counter 112 may be deemed to have in storage, at any given time, a representation of the one of the timing marks 104 then being sensed by sensor 107, the extent of the count representing the position of the mark (and the associated image as well) relative to a reference point on the disk. In its preferred form, the counter 112 is a binary up-counter, commencing its count at zero in correspondence with some nominal null point on disk 102, then upwardly counting in timed correspondence with the rotation of the disk 102, arriving at a suitable maximum count as the disk completes a full rotation. Thereupon, the synch pulse from line 109 resets the count back to zero, initiating another up count, identical to the previous one, for the next subsequent rotation of disk 102, which in accordance with the principles of the present invention is rotating at a constant rate. With brief reference to the disk embodiment shown in FIG. 2, the images 103 and timing marks 104 preferably are disposed about the outer periphery of the disk but having a discontinuity at a desired point (in FIG. 2, approximately at the seven o'clock point) which provides an advantageous reference for generation of the synch signal.

Returning to FIG. 1, the count stored in up-counter 112 (e.g. in eight bit binary coded decimal form) is furnished in parallel fashion to a comparator 113. The comparator 113 also receives an eight bit binary number from another counter 114, an up-down counter which is incremented by pulses of the synch pulse signal from timing generator 108, and which is reversed in recirculating fashion by virtue of a connection from the most significant bit to a reset means 115. Each time the comparator 113 senses equality between the counts from the respective counters 112 and 114, an energizing signal is produced, coupled to suitable pulse shaping and timing circuitry 117, and thence is provided to fire the projection system 101 to illuminate an image or series of images in the illumination zone 125.

The illustrative embodiment of FIG. 1 is configured for a "swim through" mode of operation, with the count in counter 112 being incremented by each timing mark sensed by the sensor 107, and with the count in counter 114 being incremented by synch pulses, that is, by one for each full revolution of the disk 102. The effect of incrementing counter 114 once for each full revolution of the disk 102 is to advance by one, for each full revolution of the disk 102, the count at which comparator 113 will sense equality. Hence, a given image on the disk 102 will be illuminated for one particular revolution, the next adjacent image will be illuminated for the next full revolution of the disk 102, and so on. Since the full set of images (e.g. 90 in number) are sequentially arrayed on disk 102 with each respective image corresponding to a next adjacent area of the organ being depicted, and since the rate of rotation of the disk 102 is rapid (e.g. 1800 r.p.m.), the comparator 113 output is a nearly constant pulse stream having a periodicity which is incrementally longer, by the rotation time of one image-sector per frame, than the rotation rate of the disk 102, such increment being produced by the rotation to rotation advancement of counter 114, and the consequent incremental extension of the times between which counters 112 and 114 are apprehended by comparator 113 to store equal counts. In order continuously to view the same image from disk 102, a manual control 116 is provided to hold the count in counter 114 (i.e. temporarily to disable the effect of synch pulses received at clock input 121). In such an instance, counter 114 stores a uniform, unvarying count, which will be equal to the count from counter 112 once per revolution of the disk 102, firing projection system 101 to illuminate a given, single image 103 during each revolution.

In a preferred embodiment, the counter 114 is a recirculating up/down counter, and the reset means 115 is a flip-flop which is conditioned by changes in the most significant output bit of the binary count of counter 114. With each such reconditioning of the reset means 115, the direction of count of the up/down counter is reversed; in this circumstance, the effect at the display 106 is to swim back and forth through the organ which is displayed by successive cross-sectional images on the disk 102. Variable speed swim through is attained by delaying the incrementing of counter 114 for a regular, predetermined number of revolutions of the disk 102 (i.e. increment counter 114 for each "N" synch pulses, rather than for each such pulse).

It will be appreciated that with the disk rotating at high speeds which may be in the range of 1300 r.p.m., and with disk 102 carrying in the range of 90 images 103 about its periphery, it is important that firing pulses delivered to the projection system 101 be properly coordinated with the logical functions being performed by counters 112 and 114 and by comparator 113. In the embodiment of FIG. 1, these important functions are generally ascribed to a signal conditioning unit 117, which provide the proper timing, wave shaping, pulse duration, and the like functions whereby pulses are provided which will fire the projection system 101 in appropriate fashion, initiating the firing sequence in proper timed relation to the movement of a given image through the illumination zone, and quenching the firing pulse prior to illumination of the next subsequent images to pass through the zone. Quite evidently, the precise signal conditioning parameters to be provided by the signal conditioning unit 117 will depend largely on the physical, optical, and electrical characteristics of the projection system being utilized. For present purposes it is sufficient to say that projection systems, suitable for the application at hand, are available from sundry commercial concerns, and for each such system, the signal conditioning circuitry 117 may be developed from commercially available components in accordance with the abilities of designers having ordinary skill in the art.

For the swim through embodiment shown in FIG. 1, a preferred display 106 is a commercially available vidicon tube which, as desired, couples images received from focusing lens system 105 directly to television monitors, to videotape recorders, to multi-image formatters, or the like. Utilization of the latter two instruments of course will result in suitable hard copy representation of the actual swim through effect.

In accordance with the principles of the present invention, the embodiment of FIG. 1 may readily be adapted for depiction of three-dimensional type displays, either to display the full set of images 103 in the form of a semi-transparent full organ three-dimensional projection, to display any subset of the images (e.g. a "ham slice"), or to display a combination of "swim through" and "ham slice", wherein the slice of tissue being viewed as a semi-transparent three-dimensional projection is advanced in swim through fashion through the entire organ. In the event that such three-dimensional options are to be pursued, a preferred form of the display 106 is as shown in FIGS. 4A and 4B, which depicts respective front and side views of a spiral screen of a type known in the prior art. In the FIG. 4A/4B embodiment, a relatively high inertia drum or cylinder 402 is rotatably mounted in parallel with the axis of the lens system 105, such that the helical projection screen 401 is illuminated in the field of focus of the lens system 105. For example, areas 403 and 404 of the screen 401 will be seen by observer 405 at respective distances X and Y. It is this spatial disparity, coupled with the high rate of repeatable projection of various points on the rotating screen 401, which yields the semi-transparent three-dimensional quality as perceived by the viewer 405.

In order to adapt the embodiment of FIG. 1 to produce a semi-transparent three-dimensional image of the full organ represented by the collection of images 103, clock pulses from timing generator are furnished directly to the pulse processing circuitry 117, for example by the phantom line 126, thereby disposing of the previously described logical operations associated with counters 114 and comparator 113, thus firing the projection system 101 to illuminate each and every one of the images 103. Said otherwise, such an arrangement forces the projection system 101 to fire once for each timing mark sensed by the optical timing mark sensor 107.

In the event that a "ham slice" of but a segment of the full organ is to be displayed in semi-transparent three-dimensional projection fashion, one needs only to condition the signal processing circuitry 117 to fire the projection system 101 for a selected multiple of next adjacent images from the annular image set 103, under control of the input pulses from the comparator 113. The same ham slice will be repeatably displayed if the manual control 116 thereby is utilized; in the absence of manual control, the "ham slice" will swim through the entire organ being displayed.

Figure 3B:
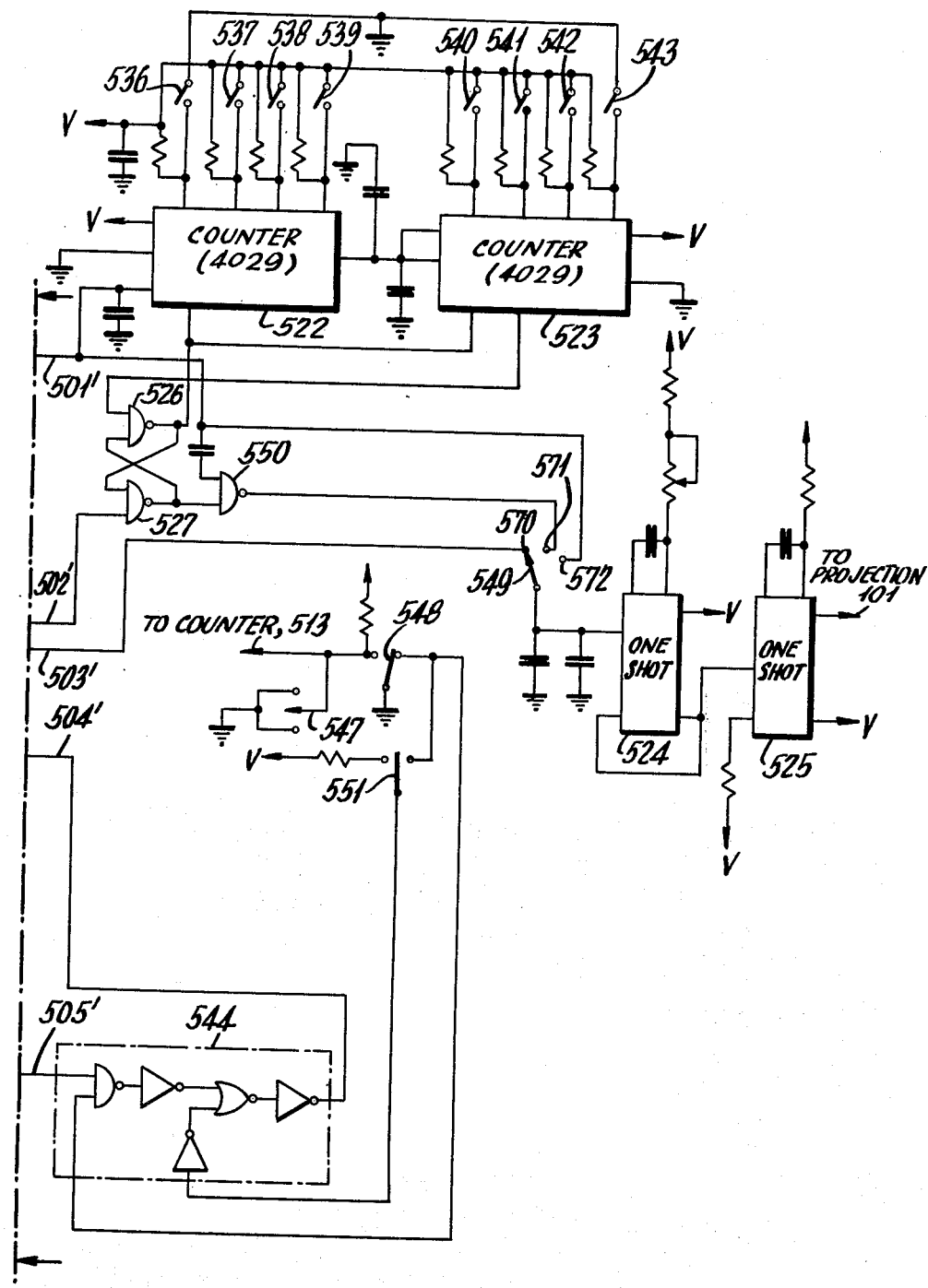

FIGS. 3A and 3B, when joined at respective connections 501-501' through 505-505', inclusive, set forth a detailed circuit schematic of a preferred embodiment of the principles of the present invention, adapted for swim through operation. It is noted that the embodiment of FIGS. 3A and 3B include integrated circuit type counters and comparators, each of which is of common commercial pedigree and may be purchased under the numeric designation shown in the blocks in FIGS. 3A and 3B.

In the figure, the disk 102 is shown in phantom cross-section, with its lowermost extremity extending between a light emitting diode 506 and a phototransistor 507, it being understood that light from diode 506 passes through or is blocked by the annulus carrying the timing marks 104 on the outer periphery of the disk 102. It is also to be understood that in accordance with commercially available embodiments, the diode 506, transistor 507, and associated biasing circuitry are commercially available in a rigid mounting comprising the optical timing mark sensor 107 shown in FIG. 1. It will thus be appreciated that the collector voltage of transistor 507 carries a signal which varies roughly in proportion to the receptions and interruptions of light conveyed from diode 506 to the base aspect of the transistor 507. A comparator 518 receives the collector voltage of transistor 507 at one input, and at another receives a reference voltage developed by a suitably biased resistive divider. The comparator 518, in conjunction with the reference, serves to generate "clean" square pulses, and to discriminate (at its output) true voltage pulses resulting from discontinuities created by timing marks, from spurious signals which for one reason or another may be developed by the photoreceptor pair 506 and 507. The output signal from comparator signal 518 is inverted at 519, and the signal at 551 is the clock signal, which is represented on line 111 of FIG. 1 as therein produced by timing generator 108. The output signal from comparator 518 is also coupled to a one-shot 517, which is configured to operate in the retrigger mode, having a time constant which is slightly longer than the clock period, but much less than the periodicity of rotation of the disk 102. Hence, the synch pulse signal, shown in FIG. 1 on line 109, is produced in FIG. 3A upon the output line 552 of the one-shot 517 and the complement thereof is produced upon output line 575.

In partial summary, then, comparator 518 in conjunction with one-shot 517 and inverter 519 produces a properly shaped clock pulse signal at line 551, and a synch pulse signal at lines 552 and 575.

The embodiment of FIGS. 3A and 3B is adapted to operate in conjunction with a disk photorecord having no more than 256 phototransparencies arrayed thereabout, and, correspondingly, a similar number of timing marks. Accordingly, the logic of FIGS. 3A and 3B employs an eight bit binary code, and counters 508, 509, 513, 514, 515, 516, 522, and 523, and comparators 511 and 512, each have a four bit capacity, whereby the serial pairs 508-509, 511-512, 513-514, 515-516, and 522-523 serve to process, in the aggregate, the eight bit code. It will be apparent that, in accordance with the abilities of those of ordinary skill in the art, similar configurations may be employed for different code combinations, in accordance with alternative image and timing mark densities on the disk 102.

The clock pulses from line 551 are coupled to counters 508 and 509, which themselves are serially interconnected, to provide an upwardly incrementing eight bit count starting from nominal zero upon each resetting thereof, and continuing through some nominal maximum eight bit count (corresponding to the number of marks 104 on disk 102) which is achieved at each regular resetting. In turn, the counters 508 and 509 are reset by the complement of the synch pulse signal from output 575 of the one-shot 517. Accordingly, counters 508 and 509 fulfill the functions previously attributed to and described in conjunction with the counter 112 of FIG. 1.

The eight bit binary count in the counters 508 and 509 is at all times coupled to a comparator pair 511 and 512, which correspond to and fulfill the function of comparator 113 of FIG. 1. That is, comparators 511 and 512 produce an output pulse on lines 502-502' and 503-503' each time the comparators 511 and 512 detect equality between the binary number displayed by counters 508 and 509, and that displayed by counters 513 and 514. In turn, counters 513 and 514 correspond to and generally fulfill the functions attributed to counter 114 in FIG. 1. It is to be noted, however, that the embodiment of FIGS. 3A and 3B includes specific options discussed but not expressly shown in the FIG. 1 embodiment, which are described hereinafter. If only a straightforward swim through, as fundamentally described in conjunction with FIG. 1, is to be employed, the counters 513 and 514 could be clocked directly by the synch signal on line 552, rather than as shown. In such event, the counters 513 and 514 would be advanced once for each synch pulse from one-shot 517, and comparators 511 and 512 together would produce an output pulse on line 502 once for each full-revolution-plus-one-timing mark of the rotating disk 102.

The embodiment of FIGS. 3A and 3B includes several functions generally described in conjunction with FIG. 1 but not specifically shown therein, one being variable speed swim through. That is, in order to add operator flexibility to the system, and to allow the operator to vary the rate at which the display swims through the subject matter of the image, a down counter 515 and 516 has been provided in the embodiment of FIGS. 3A and 3B. As may be noted, the counter 515-516 is driven by the synch signal from the one-shot 517. By virtue of operator adjusted switches 528 through 535, inclusive, an eight bit binary count is established (at the "jam" inputs of counters 515 and 516), thereby establishing, for each cycle of the counters 515 and 516, an initial count which is incremented downwardly, a unit at a time, in binary counting fashion, by the synch pulse signal. Each time the counters 515 and 516 fully count down from their prescribed "jammed" input, as established by the switches 528 through 535, a pulse is conveyed to produce an increment in counters 513 and 514. The counters 513 and 514 preferably are operating in an up/down mode, so the prevailing direction of such count then is not a factor so far as counters 515 and 516 are concerned. Hence, the function of counters 515 and 516 is to create a time period, in terms of multiple rotations of the disk 102, through which the count does not change in counters 513 and 514, and hence during which time a single image is repeatably displayed each time the binary code number associated with that image is extant in counters 508 and 509. For example, in a system employing 64 frames arrayed around the disk 102, which is rotating at 1800 r.p.m., judicious selection of "jam" codes at switches 528 through 535 permits aggregate swim through time to be varied between two seconds and eight minutes.

Another option which was described in conjunction with the FIG. 1 embodiment, but not expressly shown therein, is the capability to swim through the image with a three-dimensional "ham slice", rather than an image at a time. Logic which provides this function is shown in FIG. 3B, it being understood that suitable alterations of the display apparatus (e.g. the FIG. 4A/4B screen rather than television type displays) will also be required, but are well within the capability of those of ordinary skill in the art. In FIG. 3B, a pair of counters 522 and 523 functions together as an eight bit counter, incremented by clock pulses from line 501-501'. As in the case of counters 515 and 516, the counters 522 and 523 of FIG. 3B are down counters having their initial count established by eight manually operated switches 536 through 543, inclusive. Hence, for each cycle, counter 522-523 initiates count at the binary number set by switches 536 through 543, and then counts down, one increment per clock pulse, (i.e., one count per detected timing mark 104).

Functionally, the counters 522 and 523 establish the thickness of the "ham slice" being displayed, but the FIG. 3A apparatus as previously described performs the swim through control function as in the single frame swim through instance. As will be noted from FIG. 3B, the counters 522 and 523 set a cross-coupled flip-flop 526-527, the other input of which is conditioned by output pulses from comparator 511-512 via line 502-502'. The comparators 511 and 512, counters 522 and 523, flip-flop 526-527, and output gate 550 function together first (as in the general case) to identify the time of equality between counters 508-509 and 513-514, thereby initiating some display, and then and immediately thereafter, to illuminate not one but a number of successive images determined by the setting of switches 536 through 543. A "ham slice" thereby is displayed, which ham slice will swim through the overall image at the rate established by counters 515 and 516.

The counters 513 and 514 are coupled to a flip-flop 521, the output of which is coupled via line 505-505' to a series of gates 544, a switch network 547, 548, and 551, and thence back to the counters 513 and 514 by lines 504-504' and by a direct connection to counter 513. As described in conjunction with the embodiment of FIG. 1, the basic operation of the flip-flop 521 is to provide an alteration of the direction of counting for the up/down counters 513 and 514. Such was the operation ascribed to reset unit 115 of FIG. 1. Switch 551 fulfills the manual control function 116 shown in FIG. 1, allowing the operator to hold or temporarily stop advancement of the count in counters 513 and 514. There will result a continuous display of a given image (or "ham slice").

The switches 547 and 548 provide yet another option, not described in conjunction with the FIG. 1 apparatus, allowing for a continuous, operator directed variation of the swim through. That is, switch 547 is in reality a "joy stick", which when manipulated, (and when switch 548 is moved to the position opposite that shown in FIG. 3B), permits the operator to control the swim through, at a pace dictated by the position of the joy stick, by forcing the count in counter 513-514.

In partial summary, the foregoing has described in somewhat disjoint fashion how several alternative functions may be accomplished, to wit, straightforward single frame swim through at a fixed rate, alteration of the rate of swim through either on a single set basis or at "joy stick" established rate, and swim through of a "ham slice". In fact, it is by varying the position of switch 549 that the operator selects from among these functions, switch 549 having respective positions 570, 571 and 572. It will be noted that position 570 receives comparator output signals directly via lines 503-503', and hence relates to the non 3-D, non ham slice swim through mode. Position 571 is seen to receive signals from gate 550, which is responsive jointly to the comparators 511-512, and the ham slice counters 522-523. Accordingly, position 571 corresponds to the swim through, "ham slice" three-dimensional projection. Finally, position 572 is coupled directly, via line 501-501', to receive the clock signal. Accordingly, when switch 549 is in a position of connection to point 572, every clock pulse will fire the projection unit, such as is utilized for a full image semitransparent three-dimensional projection.

In any event, the signal from switch 549 is coupled through a network including a pair of one-shots 524 and 525, and associated biasing and shaping timing circuitry. The one-shots 524 and 525, together with their associated circuitry, provide the functions described in conjunction with, and attributed to the signal conditioning circuitry 117 of FIG. 1.

The foregoing has set forth preferred and illustrative embodiments of the principles of the present invention, but it will be understood that numerous alternative embodiments will occur to those of ordinary skill in the art without departure from the spirit or the scope of the principles of the present invention.

What is claimed is:

1. In a system employing a rotatable, disk-type phototransparency record of a plurality of sequentially associated images, said disk having said plurality of images sequentially, circumferentially disposed about a center of rotation, each image having a respectively associated reference timing indicium on said disk, a system for displaying said images comprising:
    (a) a projection system for selectively, intermittently illuminating a zone of said disk through which said images pass upon disk rotation;
    (b) means for displaying images on said disk which are so illuminated;
    (c) means for sensing the rate of disk rotation and the position of specific ones of said images thereon by detecting movement of said indicia past a given point;
    (d) means, responsive to said means for sensing, for generating a first pulse signal representative of frequency of said detected movement, and a second pulse signal representative of full disk rotations;
    (e) first counter means, incremented by said first pulse signal and reset by said second pulse signal, for developing a first count;
    (f) second counter means incremented by select pulses of said second pulse signal, for developing a second count; and
    (g) comparator means, responsive to said first and second counter means, for energizing said projection system to illuminate a given number of next occurring images in said zone, after said first count equals said second count.

2. A system as disclosed in claim 1 and further including manually operable switch means for temporarily disabling further incrementing of said second counter means.

3. A system as disclosed in claim 1 wherein said second counter means is an automatically recirculating up/down counter, counting back and forth through a predetermined range of said second count under control of said second pulse signal.

4. A system as described in claim 3 wherein said predetermined range is equal to the total number of images stored on said disk.

5. A system as described in claim 1 wherein said second counter means comprises:
    (a) a third counter, repeatably counting down from a specified initial count to zero, in response to said second pulse signal;
    (b) manually operated means for establishing said specified initial count; and
    (c) fourth counter means, incremented upon each occurrence of a given reference count of said third counter, the count in said fourth counter being said second count.

6. A system as described in claim 5, wherein said fourth counter means is an automatically recirculating up/down counter, counting back and forth through a predetermined range of said second count under control of said second pulse signal.

7. A system as described in claim 6, wherein said predetermined range is equal to the total number of images stored on said disk.

8. A system as described in claim 1 wherein said comparator means comprises:
    (a) fifth counter means, for repeatably counting from a given reference count to zero in response to said first pulse signal;
    (b) comparator means for generating an enabling signal each time said first count is equal to said second count; and
    (c) means, enabled by said enabling signal, for energizing said projection system once for each count of the next cycle of said fifth counter means.

9. A system as described in claim 8 wherein said reference count is equal to the total number of images stored on said disk.

* * * * *